(12) United States Patent
Schwedt et al.

(10) Patent No.: US 9,389,402 B2
(45) Date of Patent: Jul. 12, 2016

(54) LASER SCANNING MICROSCOPE

(71) Applicant: CARL ZEISS MICROSCOPY GMBH, Jena (DE)

(72) Inventors: Daniel Schwedt, Weimer (DE); Tiemo Anhut, Jena (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 133 days.

(21) Appl. No.: 14/227,858

(22) Filed: Mar. 27, 2014

(65) Prior Publication Data

US 2014/0211305 A1 Jul. 31, 2014

Related U.S. Application Data

(63) Continuation of application No. PCT/EP2012/003971, filed on Sep. 22, 2012.

(30) Foreign Application Priority Data

Sep. 29, 2011 (DE) .......................... 10 2011 114 754

(51) Int. Cl.
*G02B 21/00* (2006.01)

(52) U.S. Cl.
CPC .......... *G02B 21/0032* (2013.01); *G02B 21/004* (2013.01); *G02B 21/006* (2013.01); *G02B 21/008* (2013.01); *G02B 21/0076* (2013.01)

(58) Field of Classification Search
CPC ............. G02B 21/0032; G02B 21/002; G02B 21/004; G02B 21/0048; G02B 21/006; G02B 21/008; G02B 21/0076; G02B 21/0064; G02B 2207/113; G02B 21/16; G02B 21/06; G02B 21/0044; G02B 21/0024; G01J 3/02; G01J 3/021; G01J 3/0237; G01J 3/14; G01J 3/36; G01N 21/6458; G01N 21/6428; G01N 21/6452; H01J 37/28
USPC ........... 359/385, 386, 368, 202.1, 196.1, 388, 359/298; 250/458.1, 216, 234, 459.1, 224; 356/445
See application file for complete search history.

(56) References Cited

U.S. PATENT DOCUMENTS 6,028,306 A 2/2000 Hayashi
6,219,179 B1 4/2001 Nielsen et al.
(Continued)

FOREIGN PATENT DOCUMENTS

DE 102006034907 A1 1/2008
DE WO 2008012056 A1 * 1/2008 ................ G01J 3/02
(Continued)

OTHER PUBLICATIONS

Notification of Transmittal of Translation of the International Preliminary Report on Patentability (Form PCT/IB/338) of International Application No. PCT/EP2012/003971 mailed Apr. 10, 2014 with Forms PCT/IB/373 and PCT/ISA/237 (11 pages).
(Continued)

*Primary Examiner* — Thomas K Pham
*Assistant Examiner* — Ibrahima Diedhiou
(74) *Attorney, Agent, or Firm* — Westerman, Hattori, Daniels & Adrian, LLP

(57) ABSTRACT

A laser scanning microscope (LSM) consisting of at least one light source from which an illumination beam path extends in the direction of a sample, at least one detection beam path for transmitting sample light to a detector array, a first pinhole for confocal filtering in front of the detector array, a scanner for causing a relative motion between the illumination light and the sample in at least one direction, and a microscope lens. For illuminating a sample, at least two illumination beams, which the microscope lens focuses as illumination points in a sample plane, are generated in the illumination beam path. The laser scanning microscope is characterized in that in addition to the preferably adjustable, slit-shaped first pinhole, a second, preferably adjustable, slit-shaped pinhole is arranged downstream of the first pinhole so as to create optically conjugate beams arranged between the first and the second pinhole.

19 Claims, 8 Drawing Sheets

(56) References Cited

U.S. PATENT DOCUMENTS

| | | | | |
|---|---|---|---|---|
| 6,738,189 B1 * | 5/2004 | Ulrich | ............... | G02B 21/0024 359/368 |
| 2009/0045176 A1 * | 2/2009 | Wawers | ............... | B23K 26/386 219/121.67 |

FOREIGN PATENT DOCUMENTS

| | | |
|---|---|---|
| EP | 1617375 A1 | 1/2006 |
| EP | 2330454 A1 | 6/2011 |

OTHER PUBLICATIONS

Smith, P. J., et al., "Programmable Array Microscopy with a Ferroelectric Liquid-Crystal Spatial Light Modulator", Applied Optics, Optical Society of America, Washington DC; US, vol. 39, No. 16, Jun. 1, 2000, pp. 2664-2669.

International Search Report dated Jan. 3, 2013, issued in corresponding application No. PCT/EP2012/003971.

* cited by examiner

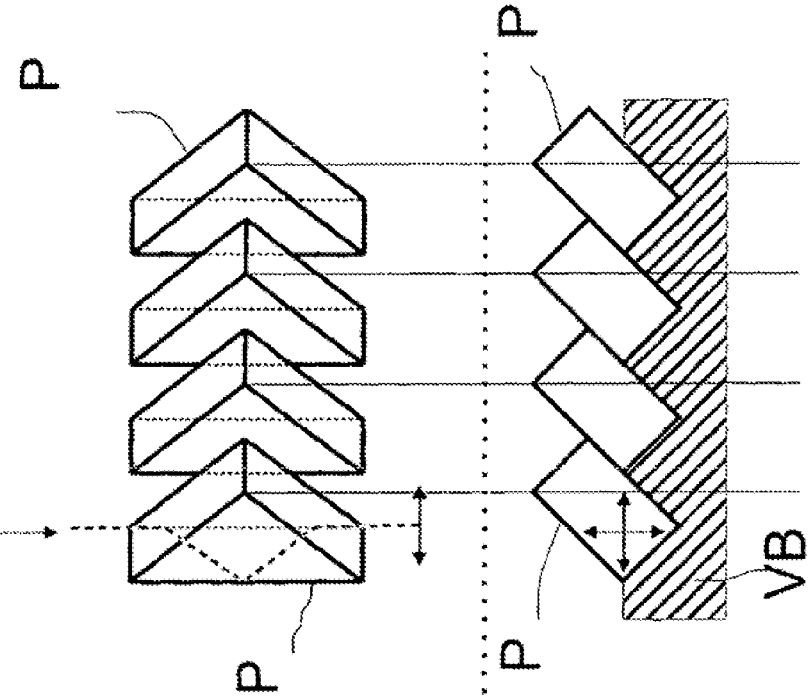
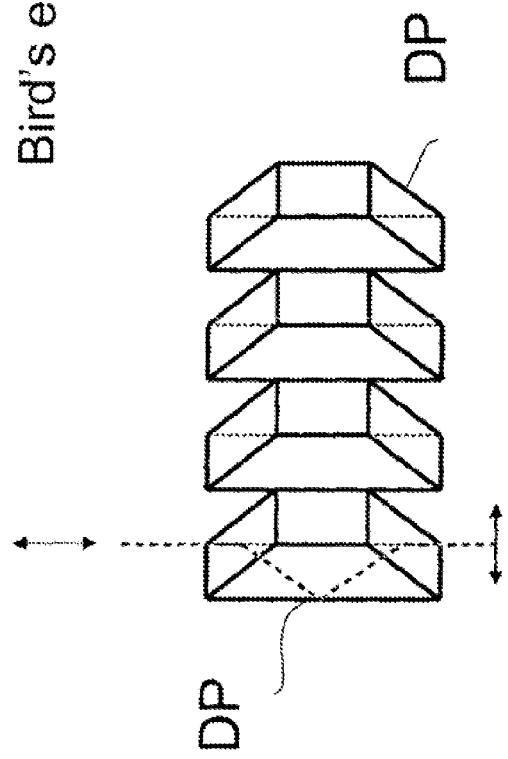
Fig 1a
Fig 1b
Bird's eye view
Front View

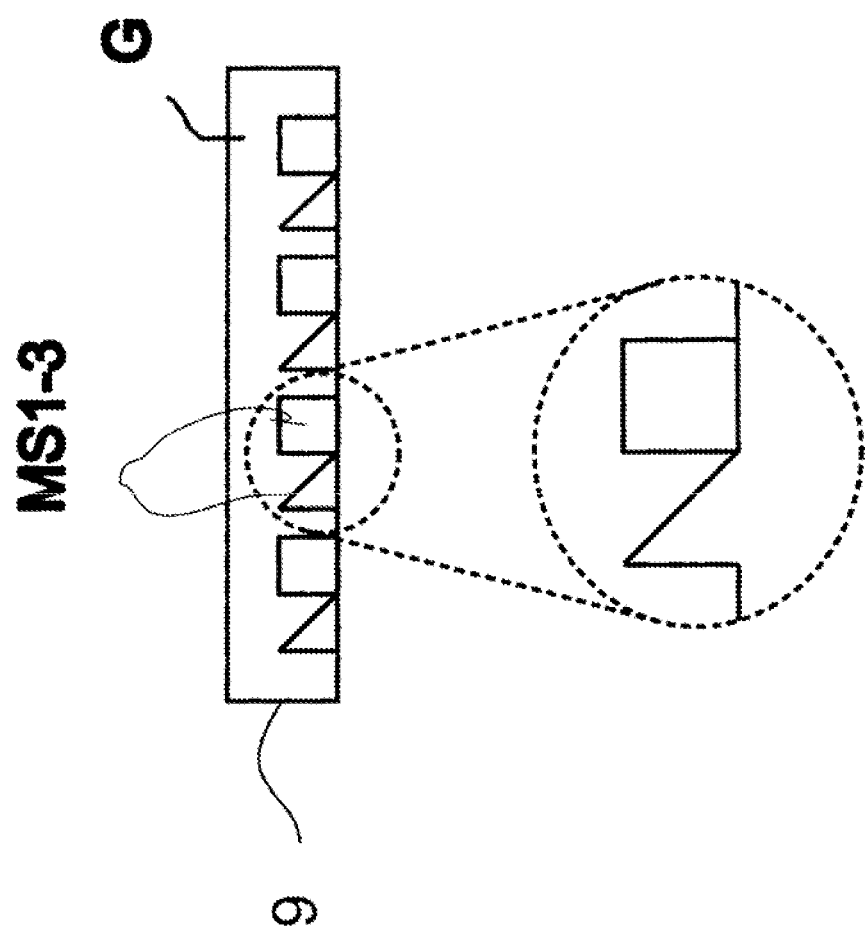

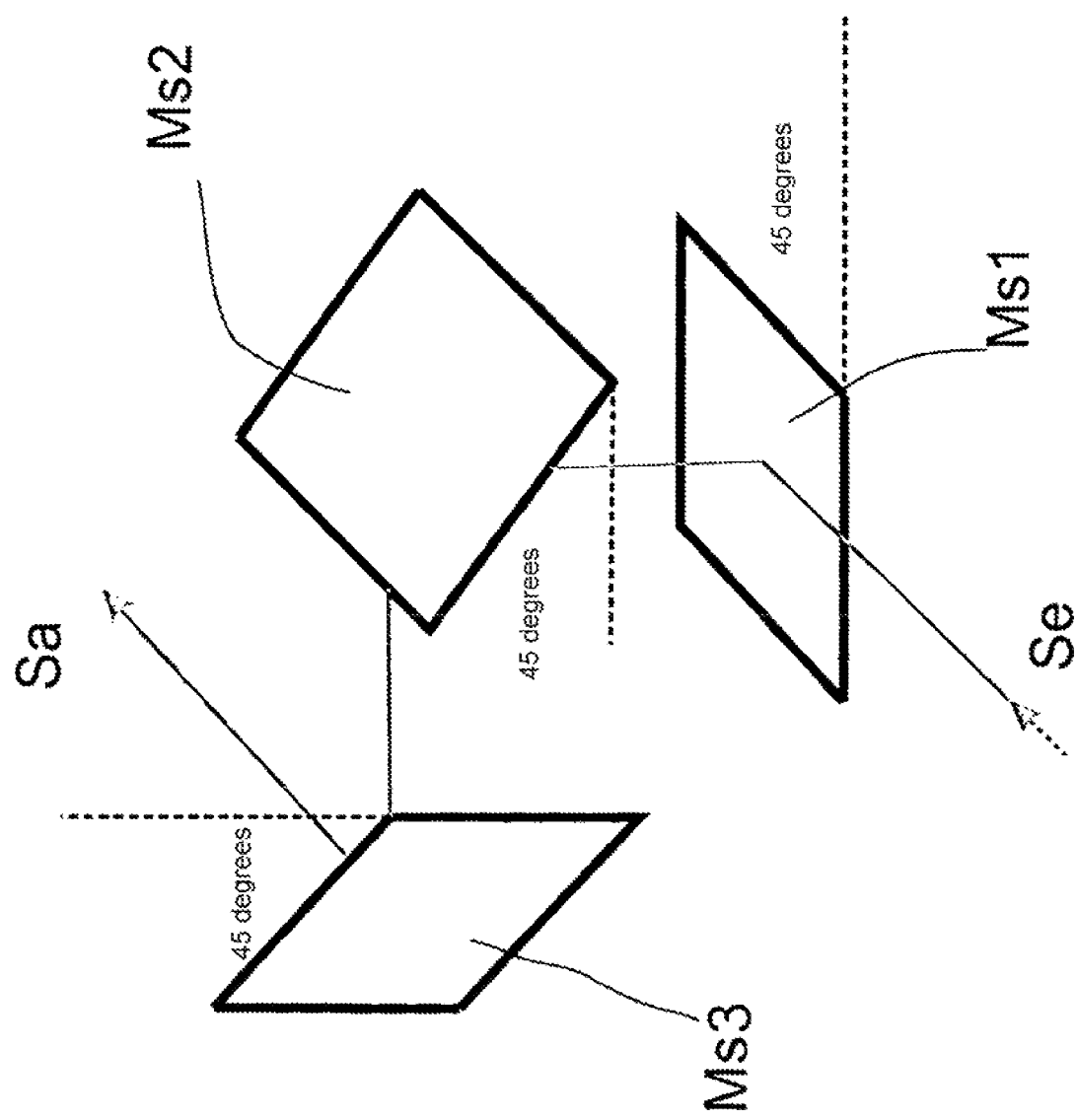

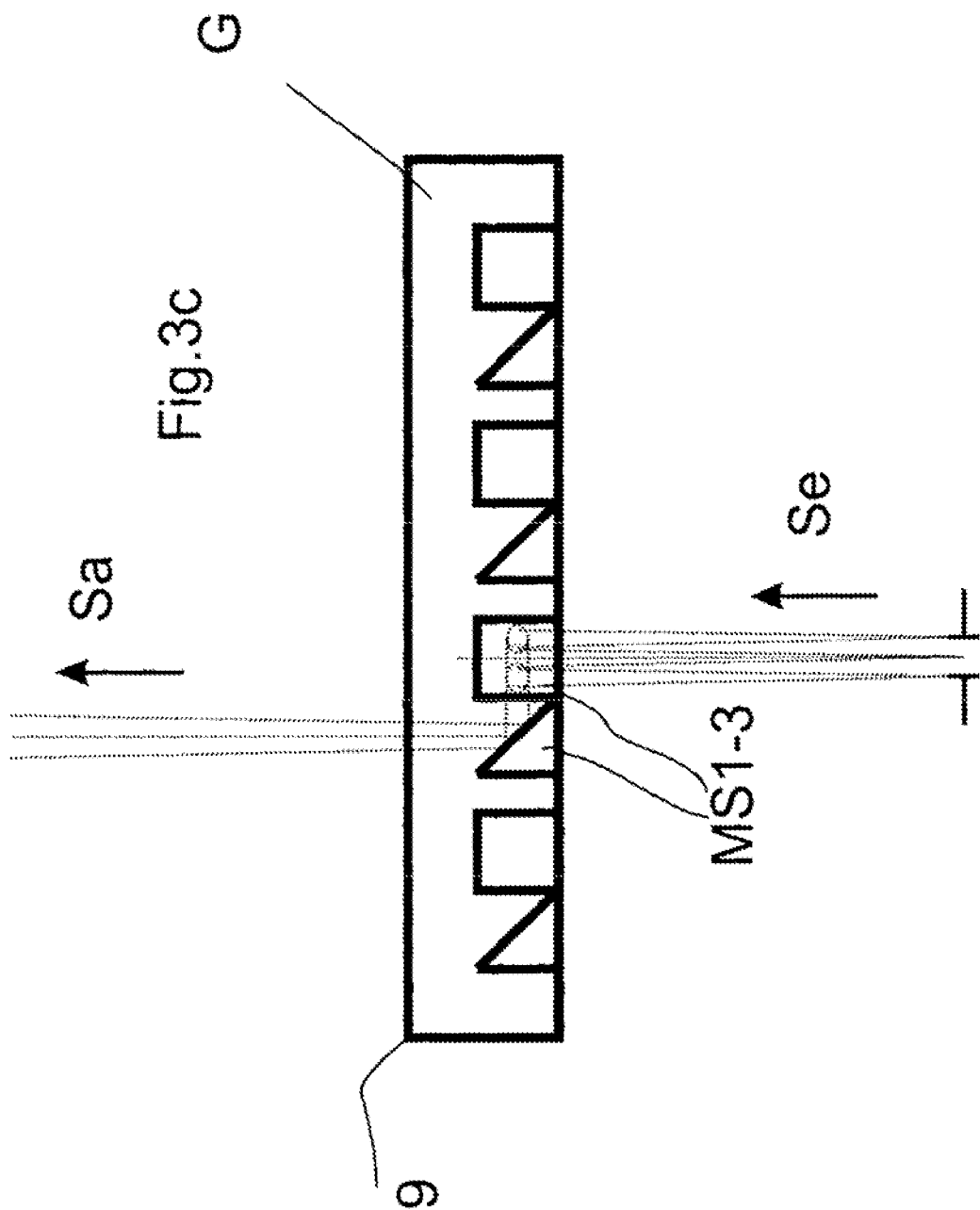

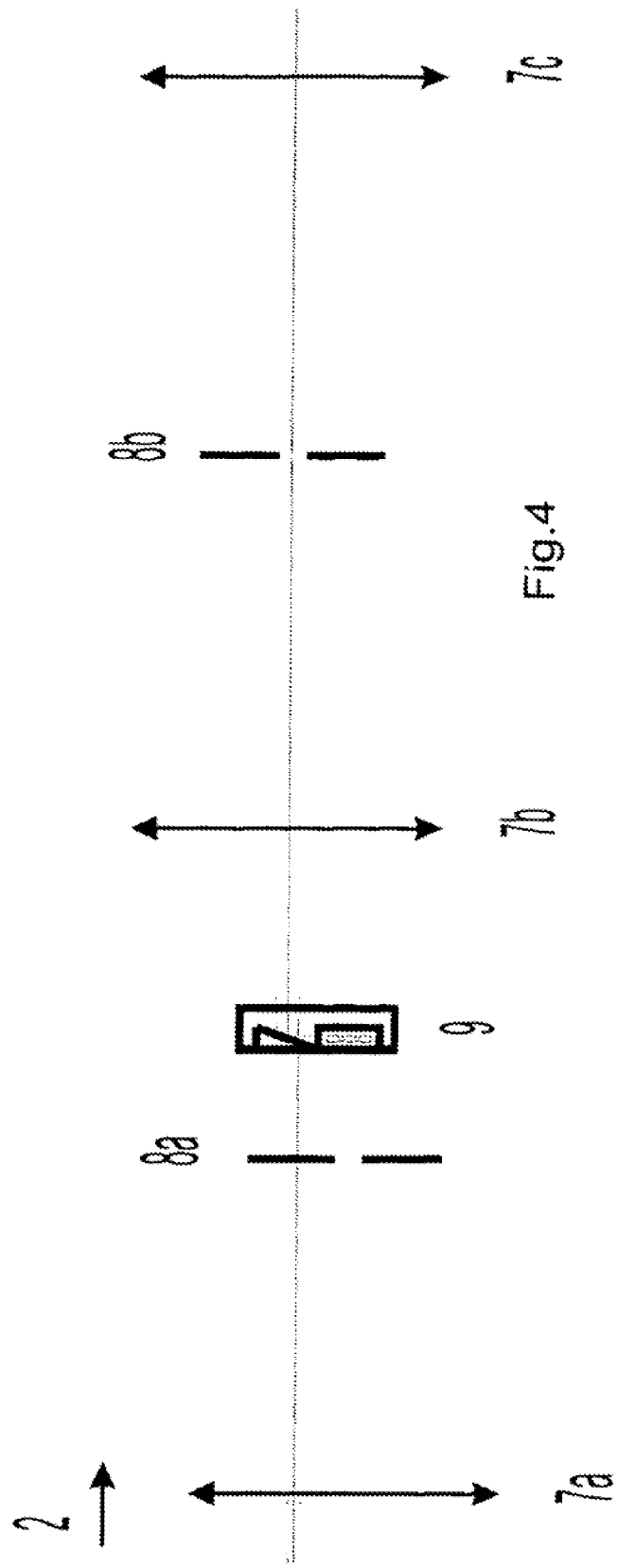

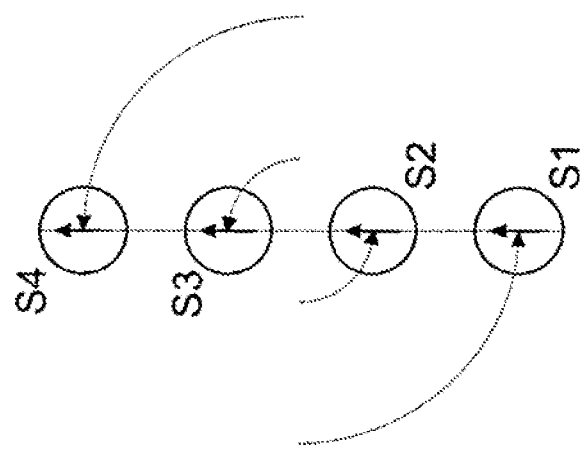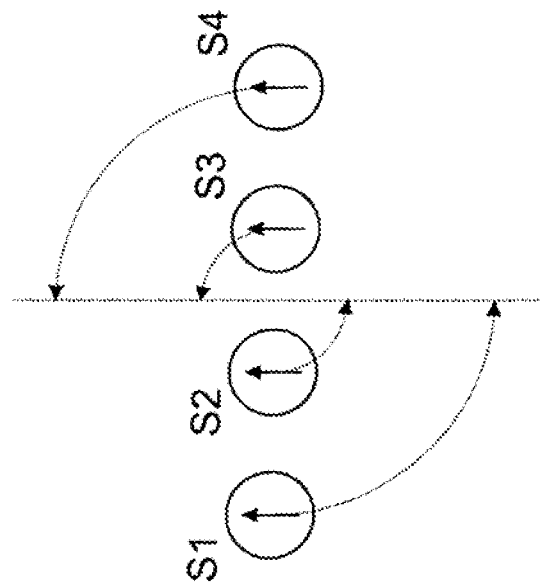
Fig.5

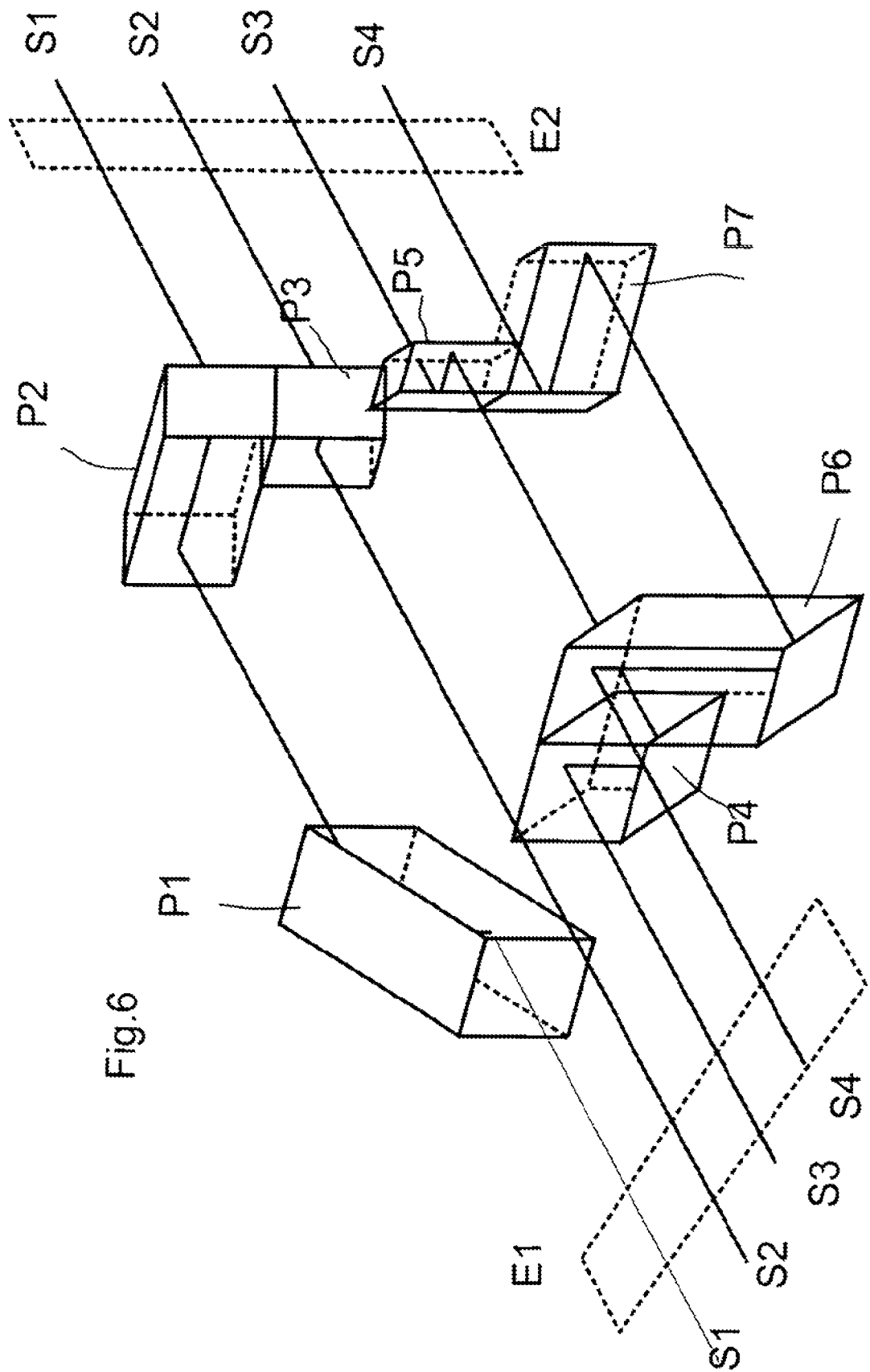

LASER SCANNING MICROSCOPE

CROSS-REFERENCE TO RELATED APPLICATIONS

This Application is a Continuation of Application PCT/EP2012/003971 filed on Sep. 22, 2012. This Application claims priority for Application 10 2011 114 754.7 filed on Sep. 29, 2011 in Germany.

BACKGROUND OF THE INVENTION (1) Field of the Invention

The invention relates to a laser scanning microscope (LSM), which scans a sample simultaneously with several spots and thus enables the image-recording time to be shortened. Such a microscope is described, for example, in U.S. Pat. No. 6,028,306, incorporated by reference herein. A device for generating multiple beams is described, for example, in U.S. Pat. No. 6,219,179, incorporated by reference herein.

(2) Description of Related Art Including Information Disclosed Under 37 CFR 1.97 and 1.98

With regard to the general construction of a confocal LSM, one can additionally refer to J. Pawley, "*Handbook of biological confocal microscopy*", Springer (2006). In an LSM, fluorescing samples in particular are stimulated to emit light by at least one laser spot or a line, the spot or the line being scanned over the sample. The fluorescence, originating from the sample, is imaged on a confocal aperture, which effectively hides the light from non-focal planes of the sample. Light transmitted through an aperture is recorded with a photo detector and assembled by a computer by means of the location information from the laser positioning into a high-contrast fluorescing image of the respective focal plane. Three-dimensional image stacks can be produced by changing the focal plane.

The scanning process inherently takes a relatively long time to record the image. The approach, known from U.S. Pat. No. 6,028,306, of accelerating the rate of recording images confocally, is to scan the sample simultaneously with several excitation beams in small regions.

In this case, the confocal filtering is a critical parameter, especially with regard to the variability of the pinhole sizes.

Many proposed solutions simply specify fixed pinhole sizes. However, this is a disadvantage if the application, i.e., the customer, requires a large number of possible lenses, since the size of the fluorescence spots in the plane of the pinholes depends on the size of the lens pupil.

In addition, the distance between pinholes is then fixed, which places especially high adjusting and stability demands on the respective beam paths or does not allow any variability in the scanning area viewed.

Furthermore, if it is desired to switch over from a multifocal mode of operation and the conventional LSM operation, the maximum size of a pinhole is also always limited by the distance between the pinholes, which in this case is switchable.

In a confocal laser scanning microscope (LSM) with a multifocal excitation of the sample, complete confocality is to be established and adjusting tolerances of the individual beam paths or the relative positions of the confocal apertures to one another are not to result in pronounced brightness differences. This problem is solved by the features of the present invention.

BRIEF SUMMARY OF THE INVENTION

The inventive solution of the problem proposed here relates to a multifocal LSM, the foci of which are disposed on a line and the number of the foci (approximately 4-8) is not too large in order to keep the manufacturing costs within bounds. However, aside from the costs, there is, in principle, no limit to the degree of parallelization (the number of excitation beams). The proposed solution of the problem advantageously utilizes the fact that the fluorescence spots in the pinhole plane are stationary and disposed linearly. According to the invention, two pinhole planes are now produced, which are optically conjugate to one another and in each of which a variable aperture, preferably a slit diaphragm, is disposed. These two slit diaphragms are aligned parallel to one another or also perpendicularly to one another, if a periscope is disposed between them to maintain the orientation. A simple rotation of the row of spots, as is realized for example in a simple periscope with two mirrors, would result however in the two slits acting in the same spatial direction and virtually duplicating the confocality in this direction.

For this reason, an optical arrangement which rotates the geometric orientation of the individual point images in relation to the orientation of the image as a whole (dot image chain) by 90° is implemented according to the invention behind the first slit diaphragm.

This can be realized in two different ways:
1. Individual rotation of the point images by means of an array of preferably miniaturized image field-rotating prisms.
2. Rearranging the point images of the whole row of spots by means of periscopic mirror arrangements, without modifying the image orientation.

The image rearrangement is followed by the (diffraction-limited) imaging into a second pinhole plane in which a variable slit diaphragm is again disposed.

In this way, there is complete confocal filtration in two orthogonal image directions and pinhole manufacturing tolerances also do not have an effect on the image quality. Moreover, a modification of the distances between spots within narrow limits is permissible without decreasing the confocal filtration and thus a slight variability in the size of the scanning area is possible in that, for example, the distance between the rotating prisms is also changed.

The segmented, image rotating means must be disposed in a position of the beam path, where each partial beam can be treated individually.

BRIEF DESCRIPTION OF THE SEVERAL VIEWS OF THE DRAWINGS

The invention is better understood by reading the following Detailed Description of the Preferred Embodiments with reference to the accompanying drawing figures, in which like reference numerals refer to like elements throughout, and in which:

FIGS. 1a and 1b are schematic diagrams of prisms used in the inventive LSM;

FIGS. 3a-3c are schematic diagrams of the inventive arrangement constituting the present invention.

FIG. 4 is a schematic drawing of the beam path through the entire assembly for confocal filtering the light emitted by the sample.

FIG. 5 is a schematic drawing of the principle of the rearrangement of the spots within a lineal array of spots; and FIG. 6 is a schematic diagram of inventive arrangements with rhomboidal prisms.

DETAILED DESCRIPTION OF THE INVENTION

Figure 2:
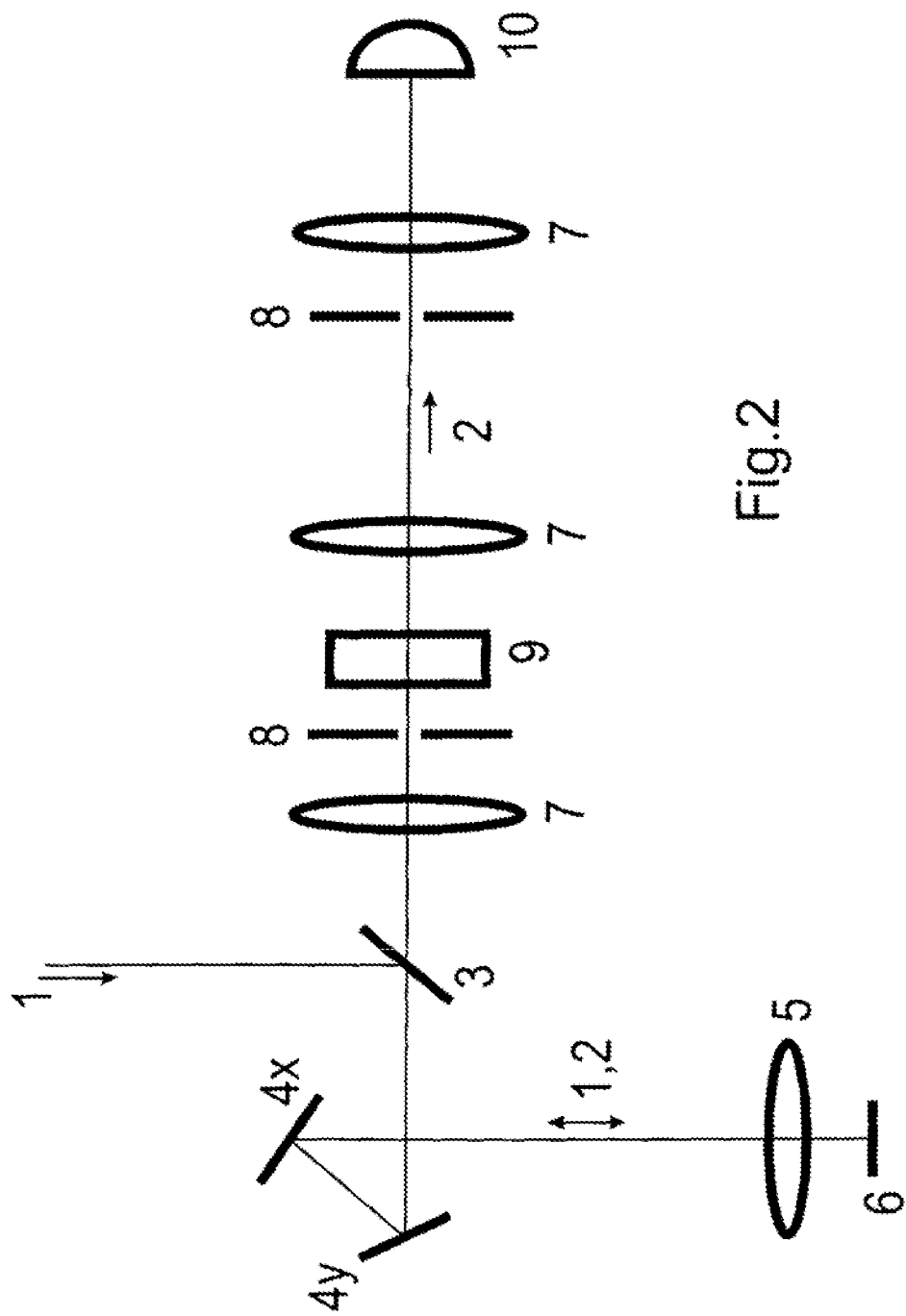
FIG. 2 is a schematic diagram of a component arrangement of the present invention in the beam path of an LSM.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

The image in FIG. 1a shows an arrangement of 4 dove prisms DP, which are rotated by 45°, in a front view at the bottom and in a bird's-eye view at the top. In order to ensure their uniform orientation, differences in height are excluded and in order to be able to arrange the prisms abutting one another, the prisms are mounted in a groove in a supporting body VB (hatched).

A dove prism is a truncated, right-angled prism. It is a type of reflection prism in which the entering light, after passing through the first inclined surface, experiences total internal reflection, after which it is reflected along the longer lower surface and emerges once again at the second inclined surface. The emerging image is inverted but is not offset laterally.

A dove prism has the property of rotating the image by twice the angle of rotation of the prism. Dove prisms are extremely useful as image rotators in fields such as astronomy, interferometry and for recognizing structure and image patterns.

In the upper part of FIGS. 1a and 1b, the beam path is shown as a dotted line. The arrow orientations indicate the change in orientation of the point image in question by way of example.

Due to the dove prisms and their 45° mounting, the four individual beams and point images experience a rotation of 90° in each case. Accordingly, this arrangement would enable the confocal filtering in a 4-fold multifocal LSM in the two slit diaphragm planes (see additional figures) in the manner described above. Abbe-König prisms or other image-rotating (prismatic or non-prismatic) elements can be used instead of the dove prisms.

However, dove prisms require the least space and can be produced monolithically. The manufacture of this structure can be simplified if appropriately dimensioned 90° prisms are used instead of the dove prisms as shown in FIG. 1b. These may then be inclined on one of the two hypotenuse edges by 45° and cemented together at the triangular areas (front sides). The prisms are then illuminated from the cathetus (either of the sides adjacent to the right angle) surfaces and refract the light towards the hypotenuse, where it is reflected and leaves the prism at the opposite cathetus surface. In this way, the image information of each individual beam is also rotated by 90° as in FIG. 1a. The image shown in FIG. 2 shows the arrangement of the proposed inventive components in the beam path of a laser scanning microscope (LSM).

Light 1 emitted from a source of illumination which is not shown, preferably by a laser, is threaded by reflection at 3 by means of a beam splitter 3 onto a beam path to stimulate fluorescence. For the sake of clarity, only the axial beam is shown here, since the generation of several partial beams as such is not a subject matter of the invention (See discussion of the prior art here-in-before).

The illumination 1 reaches the scanning mirrors 4x, 4y, which scan the laser spots over the sample 6, and the foci of which are produced by the microscope lens 5. A scanner (4x) moves the laser spots perpendicular to the axis connecting the spots over the sample, while the other scanner (4y) shifts the spots along their longitudinal axis in order to realize a further scanning in the X direction.

Fluorescent light 2 emitted from these foci and further sample light is collimated through the lens 5 into appropriate partial beams, which are scanned by the scanning mirrors (4x, 4y), i.e., directed unto stationary beams. The fluorescent light passes through the beam splitter 3 in transmission and is imaged by means of two pinhole optics 7 into two intermediate images. In each case, a slit diaphragm 8, the opening of which can be variably adjusted, is positioned in these intermediate images.

In a partial section of the beam path, in which all partial beams can be accessed individually, the image orientations of the individual point images are rotated by means of the inventive arrangement 9 by 90° relative to the orientation of the image as a whole. Finally, the fluorescence 2 is recorded electronically by means of an array of detectors 10.

The variable slit diaphragms 8 may extend parallel here in the direction of the slit length when the orientations of the individual point images are rotated separately, as shown in FIG. 1. However, they may also be oriented perpendicularly to one another if the orientation of the row of point images is rotated together, as is described in the further embodiments below.

The image in FIG. 3 shows an inventive arrangement 9, which can be generated monolithically, the image of each individual partial beam being rotated individually owing to three 90° reflections. The micro-mirrors MS1-3 required for this purpose are milled, etched or introduced by laser ablation in a glass block G. A highly reflecting coating is not required, since the incident angle of 45° on the micro-mirror surfaces is already sufficient in BK7 for total reflection. FIG. 3a shows the arrangement with four image-rotating segments in a glass block G in bird's-eye view with a single element, sections of which are enlarged.

In FIG. 3b, an arrangement of three micro-mirrors, like those contained in FIG. 3a, is shown in detail, but diagrammatically and not true to scale. The micro-mirrors MS1-MS3 are disposed at an angle of 45° to the incident normal, but are oriented differently in their position to one another. The incident beam Se is deflected upward to MS1, experiences a sideways deflection at MS2 and is deflected at MS3 as the emerging Sa beam parallel to the incident direction of S3.

The figure in 3c shows the beam path starting out from the from the split diaphragm plane and through an image-rotating segment MS1-3 for the axial beam and the two edge beams, which barely still propagate through the segment. The scale relationships correspond to a positioning of the segmented image rotator 2 mm behind the first slit diaphragm, with a numerical aperture, which is typical for LSM and a limitation of the corresponding pinhole diameter to 200 μm. This corresponds to a sufficiently wide opening and ensures that all partial beams can be manipulated separately. Moreover, the beam path illustrates the image-rotating effect of the arrangement on the individual and individual partial beams. On the incident side of the arrangement, the edge beams are next to one another in the plane of the paper and are superimposed by the first two reflections. The third reflection no longer makes any changes in the relative orientation of the partial beams within a spot bundle, but does arrange the spot bundles next to one another again on a line. At the same time, the optical axes of the spot bundles are offset with respect to one another by about half the distance between the spots. However, the distance between spots is retained, since each of the spot bundles, of which only one is shown, is offset by the same amount.

If the distance between spots is changed, the element 9 of FIG. 3, for example, could be replaced by a different prefabricated MS1-3 with a smaller distance between the individual elements.

The image in FIG. 4 diagrammatically shows the beam path through the whole of the arrangement for the confocal filtering of the fluorescence light 2, which is emitted by the sample. This is first imaged by the first lens of the pinhole optics 7a onto the first slit diaphragm 8a. The lens 7c images the two slit diaphragms 8a and 8b on top of one another. However, the beam offsets, produced by the inventive arrangement 9, and the additional glass paths are taken into consideration in a professionally known manner. For example, the lens 7b can be implemented as a system from two Fourier lenses, which initially (the first lens) still produce a collimated beam path and then (the second lens 7b) an image on 8b. However, in FIG. 4, an individual lens 7b is shown only diagrammatically. The third lens 7c collimates the fluorescence light once again, which is then passed on further in the direction of the detector and, optionally, of the detection optics.

FIG. 5 sketches the principle of the rearrangement of the spots within a linear array of spots, as may be advantageously attained, for example, by the arrangement of several telescopic mirror steps. The spots are repositioned here without their image orientation being changed. The image orientation is indicated by the direction of the arrows. The re-positioning is accomplished by means of a 90° rotation of the axis of orientation of the array of spots. In this case, the slit diaphragms 8a, 8b would be oriented to one another at an angle of 90°.

With reference to FIG. 6, this image shows the inventive arrangements P1-7 with rhomboidal prisms, each of which carries out two 90° deflections and thus introduces a periscopic beam offset in each partial beam path. In the example shown, the partial beams are first deflected from the original plane, which is defined by the direction of the beam and the direction of the spot array and is shown diagrammatically as E1, by means of a first periscope prism step P1, P4, P6 into the new vertical target planes.

As shown here, only S1, S3 and S4 are shifted sideways. S2 retains its position. It is, however, also conceivable without limitation to shift S1-S4 sideways. The second periscope prism step P2, P3, P5, P7 arranges the spots by shifting them sideways, once again one above the other, in a plane E2, which is oriented perpendicularly to the exit plane E1. S2 is shifted only sideways here.

The invention is not limited to the embodiments shown. In particular, aside from the illustrated partial beam arrangement in one plane, a partial beam matrix or a partial beam array can also be realized, for example, by several arrangements above one another, as shown in FIG. 1, and an appropriately arranged array of apertures (array of pinholes) in the two spatial directions described.

What is claimed as new and desired to be protected by Letters Patent of the United States is:

1. A laser scanning microscope (LSM) for use with a sample, the LSM comprising:
    at least one light source providing light, from which an illumination beam path emanates in the direction of the sample for illuminating the sample;
    a microscope lens, the illumination beam being focused as illuminating points by the microscope lens in a sample plane;
    a detector arrangement of at least one detector;
    at least one detection beam path for transferring sample light to the detector arrangement;
    a first adjustable, slit-shaped pinhole with a variable slit diaphragm for first confocal filtering before the detector arrangement;
    a scanner for generating a relative movement between the illumination light and the sample in at least one direction and through the microscope lens;
    a second, adjustable slit-shaped pinhole, with a variable slit diaphragm, arranged next to and downstream from the first pinhole so as to be optically conjugate to the first pinhole; and
    an image-rotating device for rotating the orientation of the illumination beam, arranged between the first and the second pinhole.

2. The laser scanning microscope according to claim 1 wherein two intermediate image planes are generated in the detection beam path for the confocal filtering, and wherein the first and the second pinholes are disposed in the two intermediate image planes.

3. The laser scanning microscope according to claim 1, wherein each variable slit diaphragm is positioned in each intermediate image plane.

4. The laser scanning microscope according to claim 1, wherein the slit diaphragms are aligned parallel to one another or have the same longitudinal orientation.

5. The laser scanning microscope according to claim 1, wherein the slit diaphragms are aligned perpendicularly to one another or have a mutually perpendicular longitudinal orientation.

6. The laser scanning microscope according to claim 2, wherein the image-rotating device is positioned between the intermediate image planes.

7. The laser scanning microscope according to claim 3, further comprising a 4f lens system for generating the second intermediate image.

8. The laser scanning microscope according to claim 3, further comprising lens optics for generating the second intermediate image, wherein the lens optics is an individual lens and wherein the first intermediate image is located in twice the focal length of the individual lens.

9. The laser scanning microscope according to claim 1, wherein the device for rotating the orientation comprises a linearly-aligned array of image field prisms rotated by 45°.

10. The laser scanning microscope according to claim 1, wherein the image-rotating device is a dove prism.

11. The laser scanning microscope according to claim 1, wherein the image-rotating device is an Abbe-König prism.

12. The laser scanning microscope of claim 1, wherein the image-rotating device is a 90° prism.

13. The laser scanning microscope according to claim 1, wherein the image-rotating device is embedded in a stationary groove.

14. The laser scanning microscope according to claim 1, wherein the image-rotating device comprises non-image-rotating periscopic mirror arrangements, which rearrange the individual spots without changing the orientation and thereby rotate the alignment of the spots in their connecting axis by approximately 90°.

15. The laser scanning microscope according to claim 1, wherein the image-rotating device comprises mirror arrangements, which rotate the image of each individual spot by means of three 90° reflections, but retain the orientation of the connecting axis of the spots.

16. The Laser scanning microscope according to claim 15, wherein the mirror arrangements are manufactured monolithically.

17. The Laser scanning microscope according to claim 16, wherein the monolithic partial arrangements are cemented to one another.

18. The Laser scanning microscope according to claim 1, wherein an illumination array is produced, which has a matrix-shaped distribution of light and comprises at least two rows or slits of at least two light sources.

19. The laser scanning microscope of claim 1, wherein the sample light is fluorescence light.

* * * * *